Jan. 6, 1970     J. R. SCHOVEE     3,487,974
LID SCOOP
Filed April 22, 1968

INVENTOR.
JOHN R. SCHOVEE
BY Thomson & Schoun

United States Patent Office 3,487,974
Patented Jan. 6, 1970

1

3,487,974
LID SCOOP
John R. Schovee, 34 Jordan Road,
Pittsford, N.Y. 14534
Filed Apr. 22, 1968, Ser. No. 723,130
Int. Cl. B65d *43/10, 47/06*
U.S. Cl. 220—60          10 Claims

ABSTRACT OF THE DISCLOSURE

This is a flexible reclosure lid 8 having a scoop portion 16 attached to a body portion 9 in such a manner that upon flexure of the lid 8 to a handle defining position, the scoop will be flexed to a scoop position (FIGS. 3 and 4) defining a volumetric area with the body portion 9 of the lid 8.

SUMMARY OF INVENTION

This invention is an improved closure lid for a container which is made of a flexible material suitable for deformation into the shape of a handle. There is included in the lid a scoop portion extending only a portion about the periphery of the lid. When the lid is in the normal flat position, the scoop portion extends in substantially parallel, flat relationship with the top of the lid. The scoop is attached to the lid top or body portion in a manner so that it will flex outwardly to form a volumetric scoop when the lid is flexed to a handled defining position adapted to be received within the container.

This invention relates generally to a scoop for a reclosure lid and in particular is an improvement in the invention in the William De Frank copending patent application Ser. No. 525,534 filed Feb. 7, 1966, and now Patent No. 3,380,307. One problem of the De Frank Lid Scoop invention is that it is difficult to use with existing automatic capping machines, whereas it is the significant object of my improvement of that invention to provide a scoop lid which would be completely suitable for use with existing automatic capping equipment in the same manner as reclosure lids of the type known before De Frank.

Other objects and advantages of this invention will be particularly set forth in the claims and will be apparent from the following description:

Figures 1, 5:
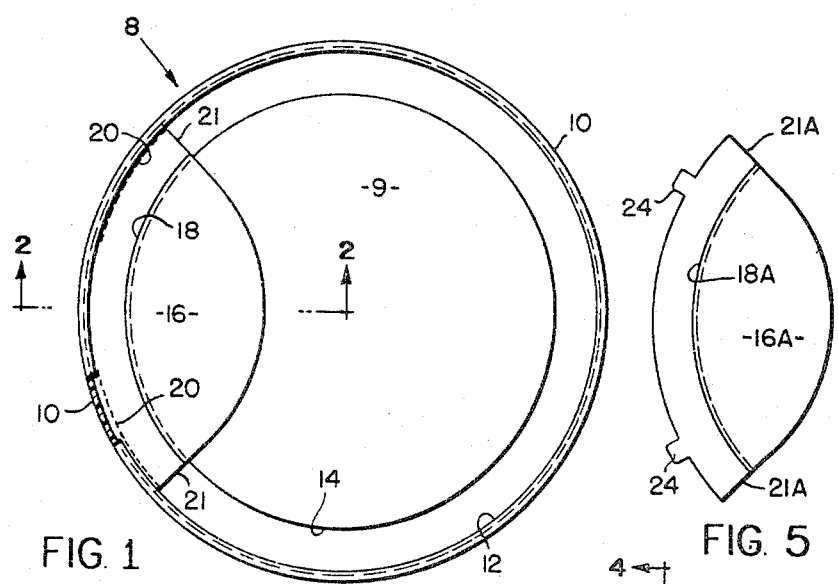
FIG. 1 is a bottom planar view of my improved scoop lid with a portion of the peripheral flange 10 broken away.
Figure 3:
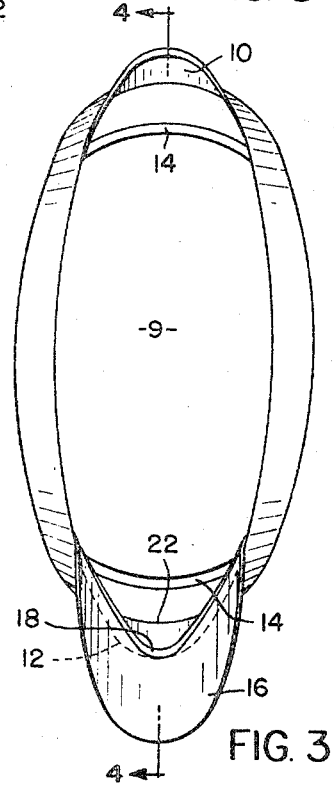
Figure 4:
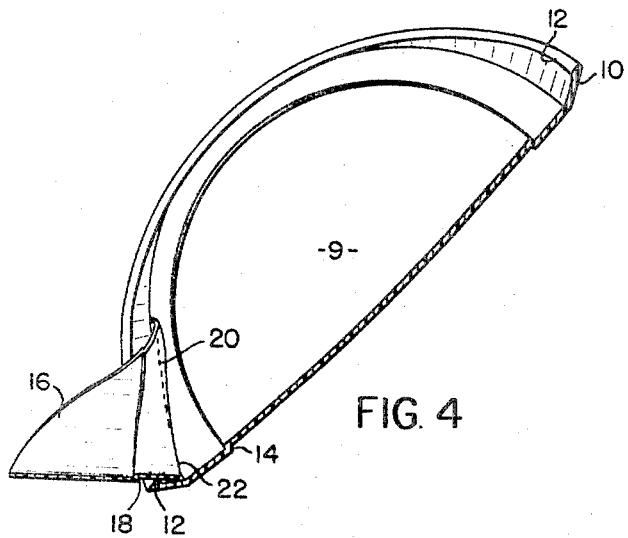

FIG. 3 is a bottom view of the FIG. 1 embodiment of my invention illustrating the lid 8 and integral scoop portion 16 thereof in a flexed position in which the scoop portion thereof forms an angle with the top of the lid which angle is suitable for scooping and the top or body portion 9 of the lid is deformed into a handle configuration;

FIG. 4 is a sectional view taken along the line 4—4 of FIG. 3 looking in the direction indicated by the direction of the arrows;

FIG. 5 is a second embodiment of the scoop portion only, which embodiment is suitable for use in the FIG. 1 embodiment of the lid in lieu of the rigidly attached scoop thereof.

With reference to FIGS. 1–4 inclusive, I have illustrated an improved lid scoop. The lid is generally indicated by the arrow and numeral 8 in FIG. 1; as is well known in the art, such reclosure lids for coffee cans or other containers are made of a resilient material, preferably polyethylene, and they are of a circular configuration as viewed from the top or bottom and adapted to overlie a cylindrical container of circular cross sections such as in the manner illustrated in the above referred to De Frank application. It will be understood that the invention is applicable to square, oblong or other shaped lids.

As is well known in the reclosure lids of this nature, the resilient lid 8 is formed of a flexible top or body portion 9 of circular configuration and has an integral flexible peripheral lip or side flange 10 adapted by peripherally surrounding, overlying and gripping the upper crimped bead of the container or can for which the reclosure lid is adapted for closure. This side flange or its equivalent is in the claims referred to sometimes as "securing means." The side flange 10 of the lid extends circumferentially around the outer edge of the circular body portion 9 and is molded integral therewith. The flange 10 has an endless bead or protrusion 12, illustrated in FIG. 2, which is adapted for passing over the peripheral bead around the top and bottom of the usual type of "tin can." This provides a means for more adequately securing the reclosure lid 8 to the can for which it is adapted for closure.

Figure 2:
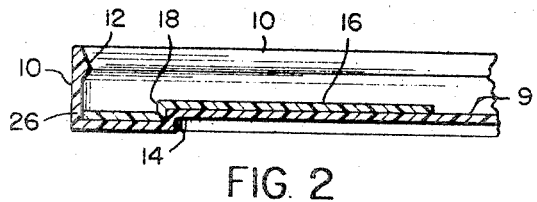
FIG. 2 is an enlarged partial sectional view taken along the line 2—2 of FIG. 1 looking in the direction indicated by the arrows.

The crux of my invention resides in providing an improvement in the construction of a flexible (preferably polyethylene) scoop proportion 16 so that it is adapted to lie substantially parallel and substantially flat against the body portion 9 when the body portion 9 is in the normal, flat, unflexed position shown in FIGURES 1 and 2, and the scoop portion 16 is adapted to flex outwardly to a scoop position defining a volumetric area with the body portion 9 when the body portion is flexed to a handle-shaped position as illustrated in FIGS. 3 and 4.

Although not essential for the concept of my invention, in the illustrated embodiment, the body portion 9 of the lid 8 is molded with an endless circular shoulder 14 spaced inwardly from the peripheral flange 10. Such a shoulder 14 need not to be included and my invention is just as suitable with lids that do not have this shoulder. The scoop portion 16 has a circular shoulder 18 adapted to mate with the shoulder portion 14 of the body portion 9 as shown in cross section in FIG. 2. However, this shoulder is also not essential to the concept of my invention.

The peripheral edge of the scoop portion 16 adapted to mate with the peripheral flange 10 is affixed to the body portion 9, as for example by ultrasonic welding illustrated in broken line at 20. The welding 20 or other means of adhesively or otherwise affixing the peripheral edge of the scoop portion 16 to the body portion 9 may extend around the full peripheral edge of the scoop to where it substantially transversely intersects the outer leading scooping edge 21 of the scoop portion 16. However, as illustrated in FIGS. 1–4 inclusive, it is also suitable for only portions of the peripheral edge to be welded at 20 or otherwise affixed to the body portions 9. As illustrated, the welding 20 extends from opposite ends of the leading edge 21 of the scoop partially along the edge, thereby to leave an unaffixed portion 22 of the peripheral edge of the scoop 16 as indicated in FIGS. 3 and 4. By reason of this particular modification, when the body portion 9 and peripheral side flange 10 are flexed to define a handle as illustrated in FIGS. 3 and 4 and the scoop portion 16 is flexed or actuated outwardly to define an obtuse angle with the body portion 9, the outward flexing of the unaffixed portion 22 is accentuated as it moves along the flange 10 from the position indicated by the numeral 26 of FIG. 2 until it engages the endless bead or projection 12 of flange 10 and stopped thereby. Although this unaffixed portion 22 is not essential to the concept of my invention, it has been found that this particular modification may minimize any coffee grounds or other granular material being scooped from being caught between the scoop portion 16 and the side flange 10 when my scoop lid 8 is inserted into the material to be scooped.

The crux of my invention being to attach the scoop portion 16 to the body portion 9 in a manner such that when the body portion 9 is in the normal, flat, unflexed position shown in FIGS. 1 and 2, the scoop 16 will lay flat or substantially flat and substantially parallel against the top 9 thereby to eliminate any depending portion of the scoop from extending axially (vertically as viewed in FIG. 2) beyond the securing flange 10. This precludes the scoop portion 16 from interfering with any orientation or handling of the lid 8 when in the normal flat position. The attachment of the scoop 16 to the body portion 9 is such that upon flexure of the lid to the handle position of FIGS. 3 and 4, the scoop is then actuated outwardly beyond the axial distance of the flange 10 to render the lid suitable for scooping and/or measuring the contents of the container being closed by this novel reclosure lid.

In FIG. 5, I have illustrated a second embodiment of my invention in which a scoop portion 16A, in lieu of the scoop portion 16, is attached or affixed to the lid 8 by means of two tabs 24 adapted to be received in corresponding slots (not shown), which slots are provided in the slide flange 10 at the position indicated by the numeral 26 in FIG. 2. The scoop portion 16A has a shoulder portion 18A corresponding to the shoulder 18 of the FIG. 1 embodiment. With this latter embodiment the scoop portion 16A may simply be packaged in the can or container for which the lid 8 is a reclosure. Thus, the user, i.e., the housewife, may simply insert the tabs 24 into the coactive slots (not shown), thereby to removeably attach the scoop 16A to the lid 8 in lieu of ultrasonic welding 20 or other manner of rigidly affixing the scoop 16 to the lid.

While I have shown and described the preferred form of mechanism of my invention and method for using the same it will be apparent that various modifications and changes may be made therein particularly in the form and relation of parts, without departing from the spirit of my invention.

I claim:
1. A lid comprising:
  (a) a flexible body portion adapted for closure of an opening of a container and deformable from a substantially flat position in which it is adapted for closure of said container into a handle-shaped position in which latter position it is adapted to be received in said opening,
  (b) a scoop portion, means attaching said scoop portion to said body portion, said scoop portion when attached to said body portion lying substantially parallel to said body portion when said body portion is in said flat position and said scoop portion is in a flat position relative to said flat position of said body portion, and
  (c) means including said attaching means between said body portion and said scoop, which means is responsive to flexure of said body portion to said handle-shaped position for deforming said scoop portion away from said body portion to a scoop position forming a volumetric area with said body portion.

2. A lid in accordance with claim 1 including securing means extending at least partially around the periphery of said lid for securing said lid in closure relationship with said container.

3. A lid in accordance with claim 2 in which said securing means comprises a flexible peripheral side flange integral with said body portion.

4. A lid in accordance with claim 3 in which said scoop portion is coactive with said flange to form an angle of less than 180° with the body portion when the body portion is deformed to define a handle.

5. A lid in accordance with claim 1 in which said scoop portion is removably attachable to said body portion.

6. A lid in accordance with claim 1 in which said scoop has an edge along which it is attached to said body portion, only a portion of said edge being affixed to said body portion, thereby to permit flexure of the unaffixed portion of said edge away from the normal line of said edge and facilitate actuation of said scoop portion to said scoop position.

7. A lid comprising:
  (a) a flexible body portion adapted for closure of an opening of a container and deformable from a substantially flat position in which it is adapted for closure of said container into a handle-shaped position in which latter position it is adapted to be received in said opening,
  (b) securing means extending vertically axially of said body portion when in said flat position and extending at least partially around the periphery of said lid for securing said lid in closure relationship with said container,
  (c) a scoop portion, means attaching said scoop portion to said body portion, said scoop portion when attached to said body portion lying substantially only within the vertical axial distance which said securing means extends from said body portion when said body portion is in said flat position and said scoop portion is in a flat position relative to said flat position of said body portion, and
  (d) means including said attaching means between said body portion and said scoop, which means is responsive to flexure of said body portion to said handle-shaped position for deforming said scoop portion away from said body portion to a scoop position forming a volumetric area with said body portion.

8. A lid in accordance with claim 7 in which said securing means comprises a flexible peripheral side flange integral with said body portion.

9. A lid comprising:
  (a) a flexible body portion adapted for closure of an opening of a container and deformable from a substantially flat position in which it is adapted for closure of said container into a handle-shaped position in which latter position it is adapted to be received in said opening,
  (b) a scoop portion attached to said body portion along at least a portion of substantially the periphery of said body portion, the peripheral edge of said body portion and said scoop portion having substantially the same configuration when substantially the entire surface area of said scoop lies in substantially the same plane as the body portion in which they both lie when in a flat position of closure with said container, and
  (c) means between said body portion and said scoop, which means is responsive to flexure of said body portion to said handle-shaped position for deforming said scoop portion away from said body portion to a scoop position forming a volumetric area with said body portion.

10. A lid in accordance with claim 9 including securing means extending at least partially around the periphery of said lid for securing said lid in closure relationship with said container.

References Cited

UNITED STATES PATENTS

| | | | |
|---|---|---|---|
| 2,750,085 | 6/1956 | Bode et al. | 220—528 |
| 2,812,121 | 11/1957 | Sheets | 222—528 |
| 2,984,381 | 5/1961 | Bennett | 220—60 |
| 3,154,226 | 10/1964 | Petitto | 222—528 |
| 3,380,307 | 4/1968 | De Frank | 73—427 |

FOREIGN PATENTS 381,606  10/1964  Switzerland.

RAPHAEL H. SCHWARTZ, Primary Examiner

U.S. Cl. X.R.

222—529